(12) United States Patent
Liu et al.

(10) Patent No.: US 11,291,335 B2
(45) Date of Patent: Apr. 5, 2022

(54) GRINDING DEVICE

(71) Applicant: TSANN KUEN (ZHANGZHOU) ENTERPRISE CO., LTD., Zhangzhou (CN)

(72) Inventors: Guanyi Liu, Tainan (TW); Haozhan Wei, Tainan (TW); Chongzhe Xu, Tainan (TW)

(73) Assignee: TSANN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 126 days.

(21) Appl. No.: 16/746,956

(22) Filed: Jan. 19, 2020

(65) Prior Publication Data
US 2020/0245816 A1 Aug. 6, 2020

(30) Foreign Application Priority Data
Feb. 1, 2019 (CN) .......................... 201910103454.4

(51) Int. Cl.
*A47J 42/46* (2006.01)
*A47J 42/06* (2006.01)
*A47J 31/42* (2006.01)

(52) U.S. Cl.
CPC .............. *A47J 42/46* (2013.01); *A47J 42/06* (2013.01)

(58) Field of Classification Search
CPC ............. A47J 42/46; A47J 42/06; A47J 31/42
USPC ....................................................... 241/166
See application file for complete search history.

(56) References Cited

U.S. PATENT DOCUMENTS

| 1,633,844 | A |   | 6/1927  | Buckwalter |
| 3,566,939 | A | * | 3/1971  | Hubrich ................. B27L 1/127 99/501 |
| 5,531,389 | A |   | 7/1996  | Husted |
| 6,830,206 | B2| * | 12/2004 | Yang ....................... A47J 42/46 241/168 |
| 2003/0141395 | A1 |  | 7/2003 | Wong et al. |
| 2014/0312152 | A1 | * | 10/2014 | Pai ......................... A47J 42/46 241/169.1 |
| 2016/0045071 | A1 | * | 2/2016 | Sahli ...................... A47J 42/20 241/261.2 |
| 2020/0221904 | A1 | * | 7/2020 | Girardi .................. A47J 42/36 |

FOREIGN PATENT DOCUMENTS

EP          1444943 A1   8/2004

\* cited by examiner

*Primary Examiner* — Jessica Cahill
*Assistant Examiner* — Mohammed S. Alawadi
(74) *Attorney, Agent, or Firm* — Cheng-Ju Chiang

(57) ABSTRACT

A grinding device includes a grinding mechanism, a driving mechanism capable of driving the grinding mechanism to operate, and a grinding seat located between the grinding mechanism and the driving mechanism. The grinding mechanism includes a rotating shaft unit inserted in and protruded from the grinding seat to be rotatably connected to the driving mechanism, an inner grinding unit sleeved on the rotating shaft unit, and an outer grinding unit surrounding and spaced from the inner grinding unit. The driving mechanism is able to drive the rotating shaft unit to bring the inner grinding unit to rotate and grind the substance to be ground in cooperation with the outer grinding unit. The grinding mechanism further includes a supporting unit sleeved on and abutted against the rotating shaft unit.

16 Claims, 9 Drawing Sheets

GRINDING DEVICE

TECHNICAL FIELD

The present invention relates to a food processor, and in particular, to a grinding device suitable for grinding beans such as coffee beans.

BACKGROUND OF THE INVENTION

Referring to FIG. 1, an existing grinding device includes a grinding mechanism 11 and a driving mechanism 12 which are connected with each other, and a grinding seat 13 which is located between the grinding mechanism 11 and the driving mechanism 12. The grinding mechanism 11 can be driven by the driving mechanism 12 to grind coffee beans, and includes a rotating shaft unit 112 which is axially inserted in the driving mechanism 12 and inserted in the grinding seat 13, an inner grinding unit 113 which is sleeved on the rotating shaft unit 112 and can be driven by the rotating shaft unit 112 to rotate, and an outer grinding unit 114 which is spaced around the inner grinding unit 113. The driving mechanism 12 includes elements such as a motor capable of driving the rotation of the rotating shaft unit 112. Since the structure of the driving mechanism 12 is well known to the technicians, the detailed description is omitted here.

Although the bottom end of the rotating shaft unit 112 is inserted in the driving mechanism 12 and limited, the top end of the rotating shaft unit 112 is a free end. Therefore, during the operation of the grinding device, not only the rotating shaft unit 112 will rotate with its own axis as the axis of rotation, but also the top end of the rotating shaft unit 112 will draw a circle and swing, which will generate a state of operation similar to the precession in physics and drive the inner grinding unit 113 to shake, so that the inner grinding unit 113 may collide with the outer grinding unit 114. In other words, the relative stability between components of this kind of grinding device is poor, and the possibility of damage caused by components colliding with each other is also high. In addition, when the inner grinding unit 113 shakes relative to the outer grinding unit 114, the distance between the inner grinding unit 113 and the outer grinding unit 114 will also change, resulting in uneven powder thickness after grinding, which needs further improvement.

SUMMARY OF THE INVENTION

The object of the present invention is to provide a grinding device capable of solving at least one problem of the background section.

A grinding device provided by the present invention includes a grinding mechanism, a driving mechanism capable of driving the grinding mechanism to operate, and a grinding seat. The grinding mechanism is located inside the grinding seat. The grinding mechanism includes a rotating shaft unit inserted in and protruded from the grinding seat to be rotatably connected to the driving mechanism, an inner grinding unit sleeved on the rotating shaft unit, and an outer grinding unit surrounding and spaced from the inner grinding unit. The driving mechanism is able to drive the rotating shaft unit to bring the inner grinding unit to rotate and grind the substance to be ground in cooperation with the outer grinding unit. The grinding mechanism further includes a supporting unit sleeved on and abutted against the rotating shaft unit.

In the grinding device of the present invention, the supporting unit defines a first supporting hole which is cooperated with the driving mechanism for two opposite ends of the rotating shaft unit to be rotatably inserted.

In the grinding device of the present invention, the supporting unit includes a first supporting seat assembled and connected to the grinding seat, and a first supporting assembly connected to the first supporting seat and sleeved on the rotating shaft unit. The first supporting assembly defines the first supporting hole. The first supporting hole and the driving mechanism are respectively used for the two opposite ends of the rotating shaft unit to be rotatably inserted.

In the grinding device of the present invention, the first supporting assembly includes a first bearing defining the first supporting hole for the rotating shaft unit to be inserted into and abutted against, and a first supporting member connecting to the first supporting seat and supporting the first bearing.

In the grinding device of the present invention, the rotating shaft unit includes a first shaft part inserted in the first supporting hole, an opposite second shaft part inserted in the driving mechanism, and a connecting shaft part connected between the first shaft part and the second shaft part and having an outer diameter larger than the first shaft part. The supporting unit further includes an elastic member sandwiched between the connecting shaft part and the first supporting assembly.

In the grinding device of the present invention, the first supporting member includes an outer ring connected to the first supporting seat, an inner ring spaced from the outer ring and provided for the insertion of the first bearing, and a plurality of ribs connected between the outer ring and the inner ring.

In the grinding device of the present invention, the supporting unit further includes a second supporting assembly assembled to the first supporting seat and inserted by the rotating shaft unit. The second supporting assembly is located between the inner grinding unit and the grinding seat and is sleeved on the rotating shaft unit. The second supporting assembly defines a second supporting hole which is cooperated with the first supporting hole for the two opposite ends of the rotating shaft unit to be rotatably inserted.

In the grinding device of the present invention, the rotating shaft unit is detachably inserted into the driving mechanism, and the first supporting seat is detachably assembled and connected to the grinding seat, so that the grinding mechanism is able to be detached from or assembled to the grinding seat.

In the grinding device of the present invention, the driving mechanism is provided with an assembling hole having a polygonal cross section. The rotating shaft unit includes a first shaft part and an opposite second shaft part. The second shaft part has a polygonal cross section and is detachably inserted into the assembling hole.

In the grinding device of the present invention, the second supporting assembly includes a second supporting seat assembled to the first supporting seat, and a second bearing arranged in the second supporting seat for the rotating shaft unit to be inserted into and abutted against. The second supporting seat is located between the inner grinding unit and the grinding seat, and the second bearing defines the second supporting hole.

In the grinding device of the present invention, the second supporting seat includes a bottom base used for the second bearing to be inserted into and located between the inner grinding unit and the grinding seat, and a peripheral wall extending from the bottom base. The bottom base is cooperated with the peripheral wall to define a receiving space for receiving the inner grinding unit and the rotating shaft unit. The grinding mechanism further includes a powder cleaning unit sleeved on the rotating shaft unit and located between the bottom base of the second supporting seat and the inner grinding unit. The powder cleaning unit includes a rotary member sleeved on the rotating shaft unit and a plastic member connected to the rotary member. The plastic member includes a plurality of films extending outwards and spirally and abutting against the bottom base.

In the grinding device of the present invention, the supporting unit further includes a second supporting assembly located between the inner grinding unit and the grinding seat and sleeved on the rotating shaft unit. The second supporting assembly defines a second supporting hole which is cooperated with the driving mechanism for two opposite ends of the rotating shaft unit to be rotatably inserted.

The beneficial effects brought by the present invention are: the grinding mechanism provides support for the rotating shaft unit by the supporting unit abutting against the rotating shaft unit, which can improve the stability of the rotating shaft unit, to solve the problem of poor stability of the rotating shaft unit and the problem of uneven powder thickness due to the shaking of the inner grinding unit relative to the outer grinding unit.

DETAILED DESCRIPTION OF PREFERRED EMBODIMENTS

The present invention will be described in detail with reference to the accompanying drawings and the embodiments. It should be noted that similar elements are represented by the same number in the following description.

Figure 1:
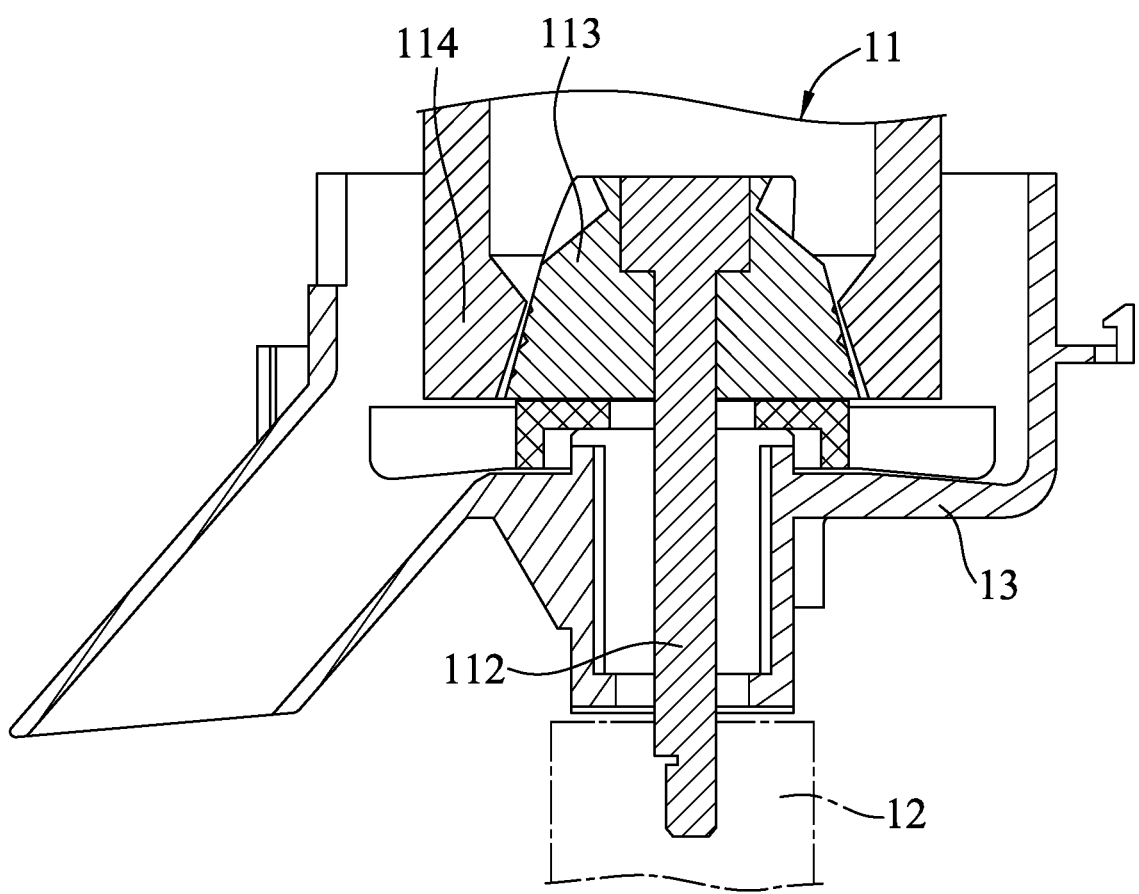
FIG. 1 is a cross-sectional view showing an existing grinding device.
Figure 2:
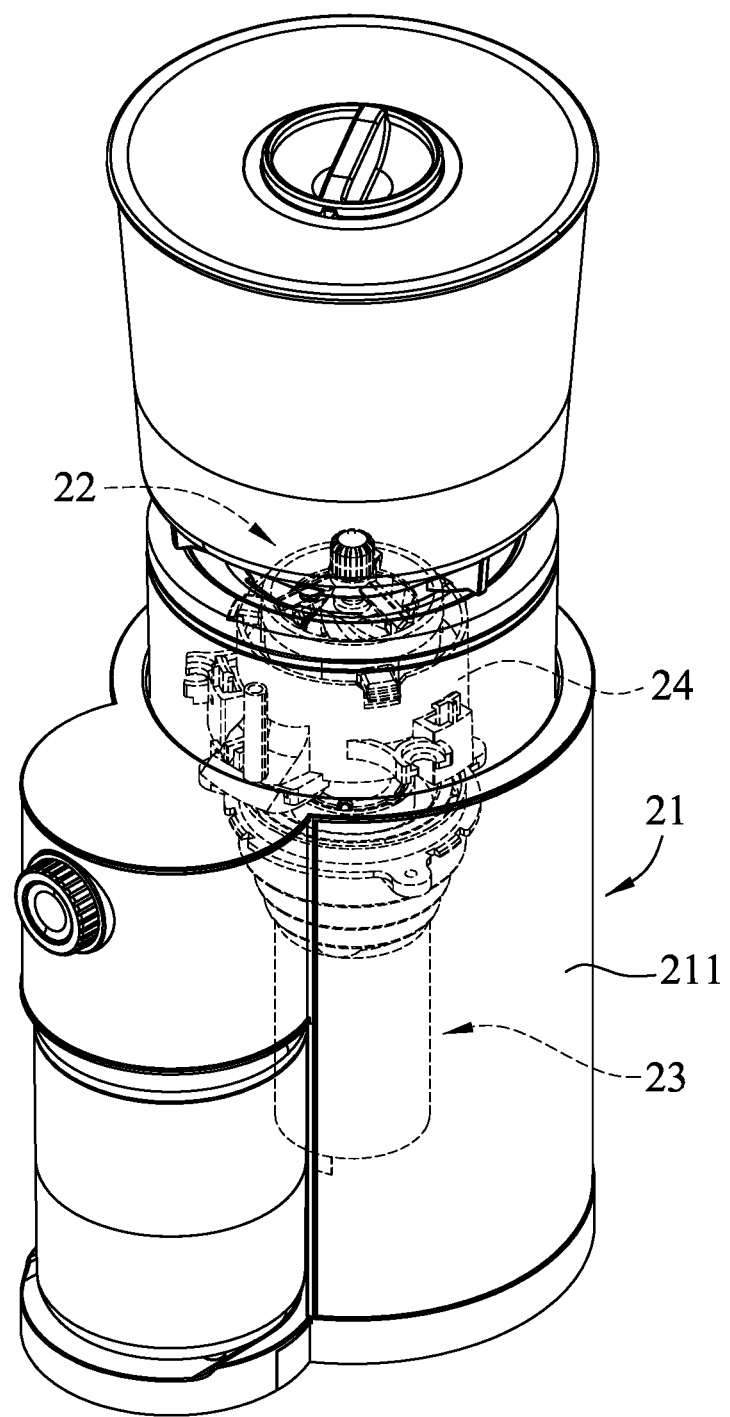
FIG. 2 is an isometric view showing a grinding device according to the first embodiment of the present invention when used in a coffee machine.
Figure 3:
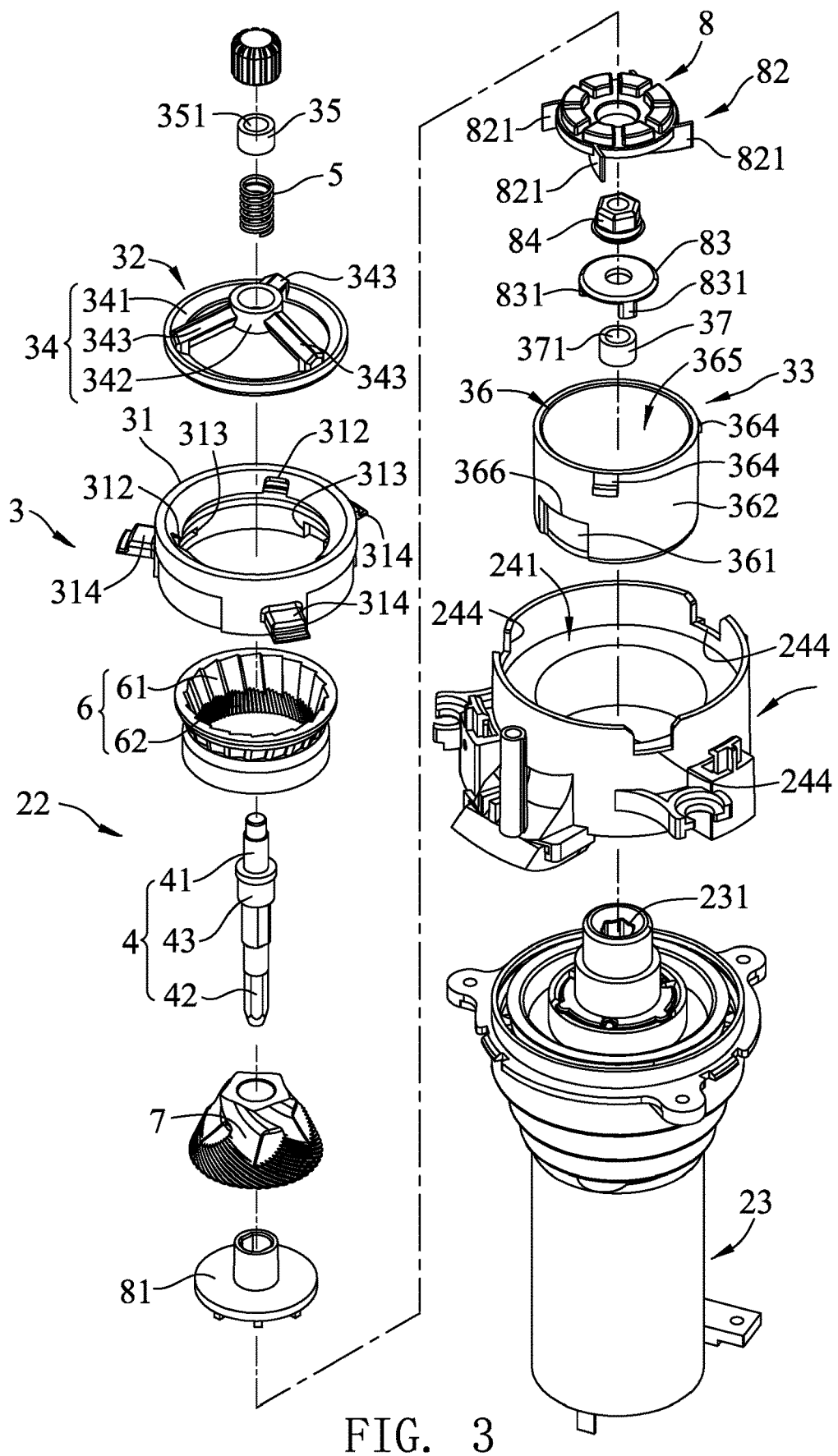
FIG. 3 is an exploded isometric view showing the grinding device of the first embodiment.
Figure 4:
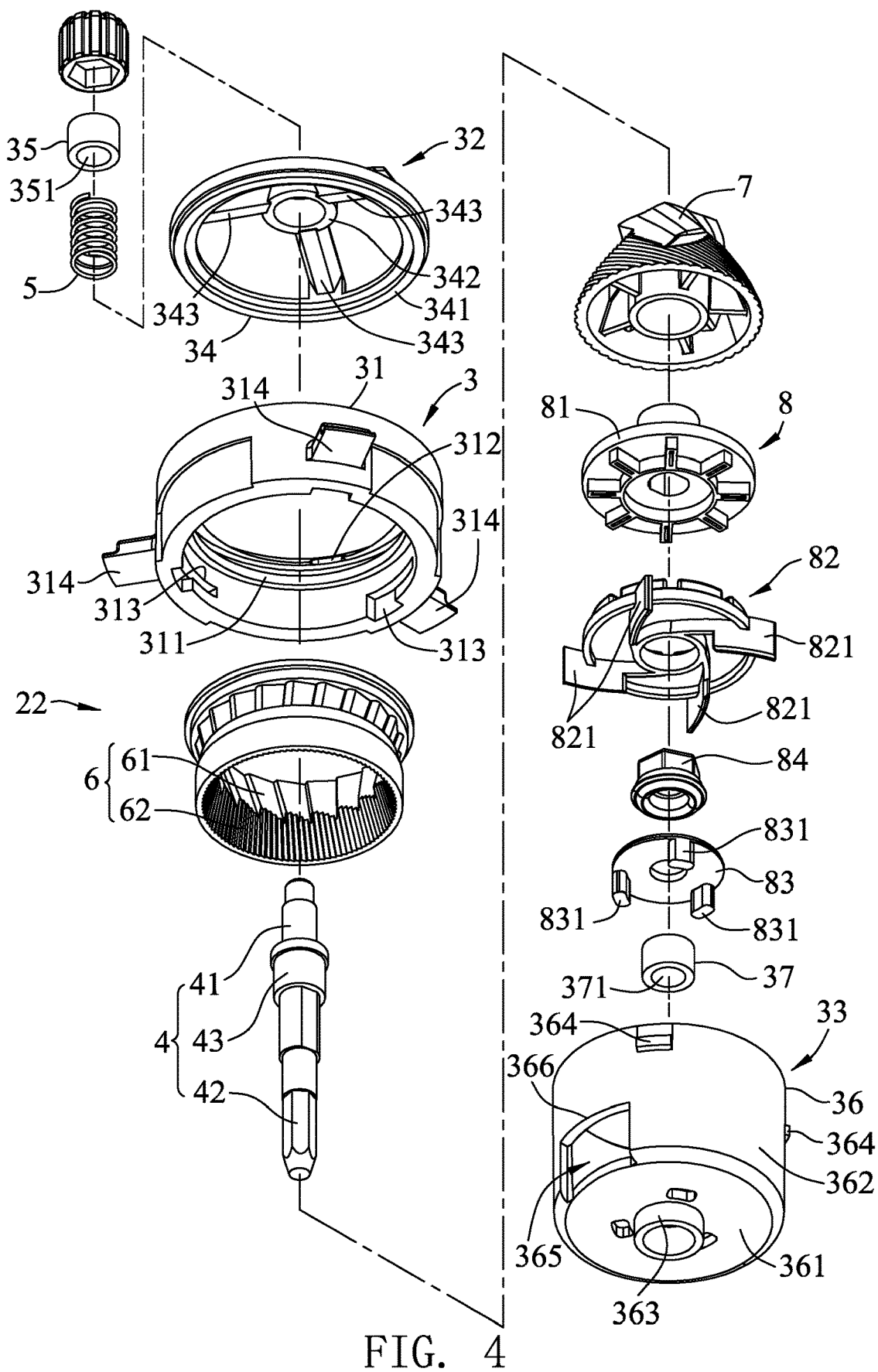
FIG. 4 is an exploded isometric view showing the grinding mechanism of the first embodiment.

Referring to FIGS. 2-4, a first embodiment of the grinding device of the present invention is suitable for mounting in a body 211 of a coffee machine 21 and grinding a substance to be ground (not shown in the figures). The substance to be ground is coffee bean in the first embodiment.

The grinding device of the first embodiment includes a grinding mechanism 22 capable of grinding the substance to be ground, a driving mechanism 23 under the grinding mechanism 22 and capable of driving the grinding mechanism 22 to operate, and a grinding seat 24. The grinding mechanism 22 is located inside the grinding seat 24.

Figure 5:
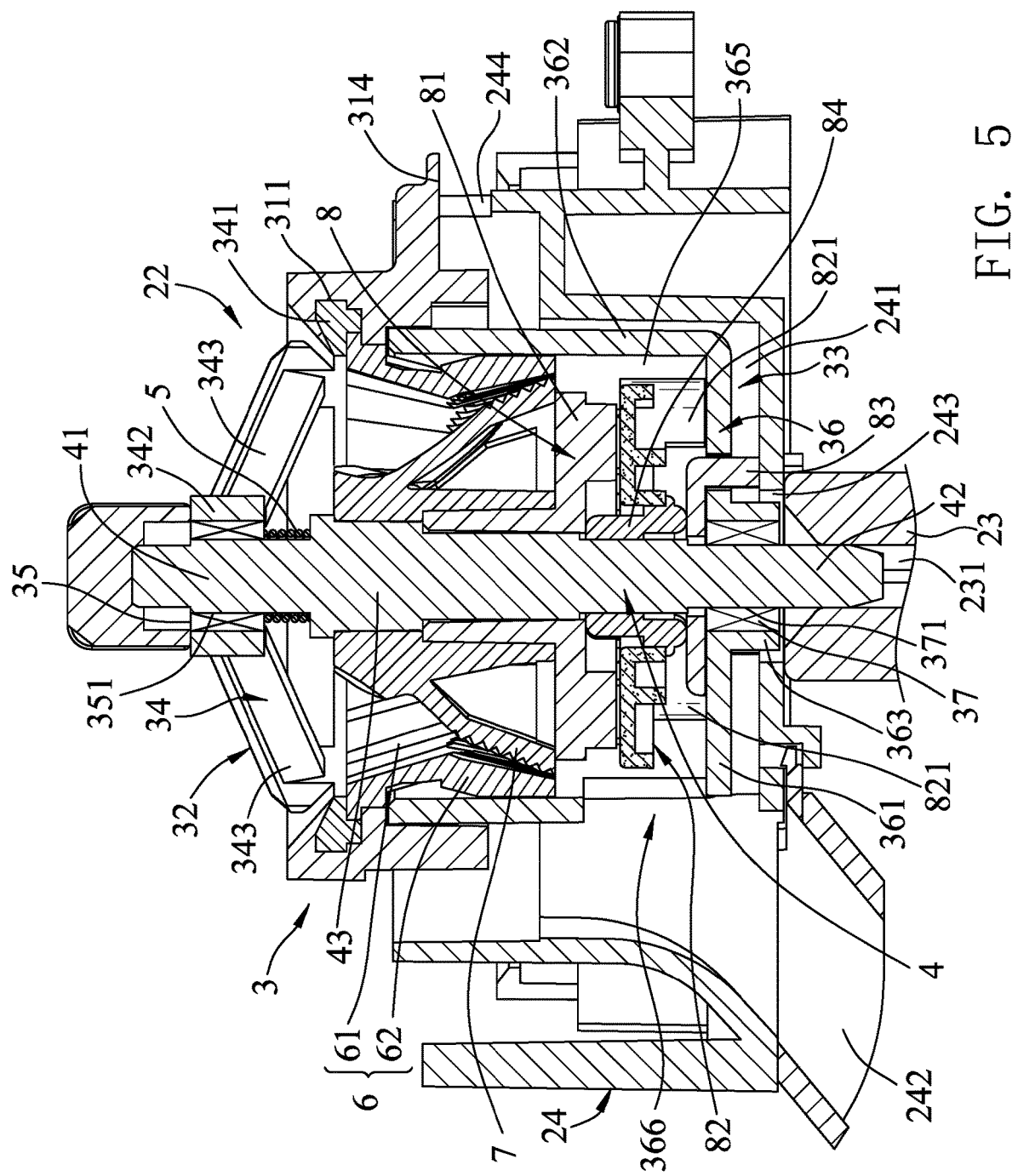
FIG. 5 is an assembled isometric view showing the grinding device of the first embodiment.

Referring to FIGS. 3-5, the grinding mechanism 22 includes a supporting unit 3 installed on the grinding seat 24, a rotating shaft unit 4 assembled on the supporting unit 3, an elastic member 5 sleeved on the rotating shaft unit 4, and an outer grinding unit 6, an inner grinding unit 7 and a powder cleaning unit 8 located between the supporting unit 3 and the rotating shaft unit 4.

The supporting unit 3 includes a first supporting seat 31 supported on the grinding seat 24, a first supporting assembly 32 embedded in the top of the first supporting seat 31, and a second supporting assembly 33 embedded in the bottom of the first supporting seat 31.

The first supporting seat 31 is substantially annular. At the top of the first supporting seat 31, an annular groove 311 (see FIG. 5) is formed for embedding the first supporting assembly 32, and three rib holding grooves 312 extend upwards from the annular groove 311 and are spaced from each other at equal intervals (due to the angle of view, only two rib holding grooves 312 are shown in the figures, see FIG. 3). At the bottom of the first supporting seat 31, three assembling grooves 313 which are spaced from each other at equal intervals and substantially inverted L-shaped are formed for the assembly of the second supporting assembly 33 (due to the angle of view, only two assembling grooves 313 are shown in the figures, see FIG. 4). The first supporting seat 31 further includes three limiting blocks 314 which extend radially outwards for the first supporting seat 31 to be limited by the grinding seat 24 and unable to rotate relative to the grinding seat 24 (see FIG. 4).

The first supporting assembly 32 includes a first supporting member 34 and a first bearing 35 installed in the first supporting member 34.

The first supporting member 34 includes an outer ring 341 which is annular and embedded in the annular groove 311 of the first supporting seat 31, an inner ring 342 which is spaced from the outer ring 341 and provided for the insertion of the first bearing 35, and a plurality of ribs 343 which are connected between the outer ring 341 and the inner ring 342 and embedded in the rib holding grooves 312 of the first supporting seat 31 respectively.

The first bearing 35 is sleeved on the rotating shaft unit 4 and abuts against the rotating shaft unit 4. The first bearing 35 is defined with a first supporting hole 351 for the top end of the rotating shaft unit 4 to be rotationally inserted therein.

The second supporting assembly 33 includes a second supporting seat 36 assembled at the bottom of the first supporting seat 31, and a second bearing 37 arranged in the second supporting seat 36.

The second supporting seat 36 includes a substantially circular bottom base 361 provided for the insertion of the second bearing 37, a peripheral wall 362 extending upwards from the bottom base 361, an annular seat 363 extending downwards from the bottom base 361, and three assembling blocks 364 extending radially outwards from the peripheral wall 362 (due to the angle of view, only one or two of the assembling blocks 364 are shown in the figures).

The bottom base 361 is located under the outer grinding unit 6, the inner grinding unit 7 and the powder cleaning unit 8, and is cooperated with the peripheral wall 362 to define a receiving space 365 for receiving the rotating shaft unit 4, the outer grinding unit 6, the inner grinding unit 7 and the powder cleaning unit 8. The peripheral wall 362 is laterally provided with a powder outlet 366. The assembling blocks 364 are embedded in the assembling grooves 313 of the first supporting seat 31, respectively.

The second bearing 37 is inserted in the annular seat 363 of the second supporting seat 36, and the second bearing 37 is sleeved on and abutted against the bottom end of the rotating shaft unit 4. The second bearing 37 defines a second supporting hole 371 for the bottom end of the rotating shaft unit 4 to be rotatably inserted therein.

The rotating shaft unit 4 includes a first shaft part 41 and an opposite second shaft part 42 provided for being assembled and connected to the driving mechanism 23, and a connecting shaft part 43 connected between the first shaft part 41 and the second shaft part 42 with an outer diameter larger than the first shaft part 41.

The first shaft part 41 and the second shaft part 42 are respectively inserted into the first supporting hole 351 and the second supporting hole 371, and are respectively abutted against the first bearing 35 and the second bearing 37, and are respectively supported by the first bearing 35 and the second bearing 37. The second shaft part 42 is inserted in the grinding seat 24, and protrudes downward from the grinding seat 24, and is inserted in the driving mechanism 23. The cross section of the second axis part 42 is polygonal. The width of the connecting shaft part 43 is larger than the first shaft part 41 and the second shaft part 42.

The elastic member 5 is sleeved on the first shaft part 41, with a top end abutting against the first bearing 35 of the first supporting assembly 32 and a bottom end abutting against the connecting shaft part 43. The elastic member 5 provides an elastic force to maintain the interval distance between the first supporting assembly 32 and the connecting shaft part 43.

The outer grinding unit 6 includes an upper grinding part 61 and a lower grinding part 62 which are connected with each other. The upper grinding part 61 is located under the first supporting member 34, and has a shrinking size in the direction from top to bottom, and the top end of the upper grinding part 61 is embedded in the annular groove 311 of the first supporting seat 31. The lower grinding part 62 extends from the upper grinding part 61 with an expanded size in the direction from top to bottom. The lower grinding part 62 cooperates with the upper grinding part 61 to surround the inner grinding unit 7 at interval.

The inner grinding unit 7 has a shape of a substantially truncated cone, and is sleeved on the connecting shaft part 43 and the second shaft part 42 of the rotating shaft unit 4, and is located between the outer grinding unit 6 and the powder cleaning unit 8 along the radial direction.

The powder cleaning unit 8 includes a rotary member 81 sleeved on the rotating shaft unit 4, a plastic member 82 assembled to the rotary member 81 and extending downward and abutting against the bottom base 361 of the second supporting seat 36, and a second supporting member 83 and a third supporting member 84.

The plastic member 82 has a plurality of films 821 extending radially outwards and spirally. The second supporting member 83 includes a plurality of pins 831 inserted in the bottom base 361 and abutted on the grinding seat 24. The grinding mechanism 22 can be supported on the grinding seat 24 by the pins 831. The third supporting member 84 is in the shape of a nut, abutted against the second supporting member 83 and the rotary member 81, sleeved on the second shaft part 42 of the rotating shaft unit 4, and provided for the plastic member 82 to sleeve on.

The driving mechanism 23 is formed with an assembling hole 231 with a shape corresponding to the shape of the second shaft part 42 of the rotating shaft unit 4. The assembling hole 231 is used for the second shaft part 42 to be detachably assembled with the driving mechanism 23, such that the driving mechanism 23 can drive the rotating shaft unit 4 to rotate with its own axis.

The grinding seat 24 defines a grinding space 241 provided for the grinding mechanism 22 to install, a powder discharge channel 242 extending outwards and downwards from the grinding space 241 (see FIG. 5), a through hole 243 communicating with the grinding space 241, and three limiting grooves 244 provided at equal intervals and formed by recessing downwardly from top to bottom. The through hole 243 and the first supporting hole 351 are oppositely spaced from each other, respectively for the insertion of the second shaft part 42 and the first shaft part 41 of the rotating shaft unit 4. The limiting grooves 244 are respectively used for the limiting blocks 314 of the first supporting seat 31 to embed therein, so as to limit the first supporting seat 31.

When the grinding device of the first embodiment operates, the driving mechanism 23 can drive the first shaft part 41 and the second shaft part 42 of the rotating shaft unit 4 to be supported and limited by the first bearing 35 and the second bearing 37 respectively. Therefore, when the rotating shaft unit 4 is rotating, the top end (i.e., the first shaft part 41) will not have the situation of drawing circle and swinging, and the operation stability is good, thereby avoiding the problem that the inner grinding unit 7 collides with the outer grinding unit 6 due to the shaking of the rotating shaft unit 4. Meanwhile, the powder ground by the first embodiment has better uniformity of thickness and fineness.

Further, the elastic member 5 can maintain the distance between the first supporting assembly 32 and the connecting shaft part 43, and can also keep the outer grinding unit 6 embedded in the first supporting assembly 32 at a certain distance from the inner grinding unit 7, thereby also having the effect of avoiding the outer grinding unit 6 from colliding with the inner grinding unit 7 and having the effect of ensuring uniform powder thickness and fineness.

In the first embodiment, the first supporting member 34 and the first supporting seat 31 are two-piece detachable design, which have the advantages of detaching from each other to be cleaned thoroughly. However, in other embodiments of the present invention, the first supporting member 34 and the first supporting seat 31 may be integrally formed, so as to have the advantages of convenient assembly and disassembly wholly.

Figure 6:
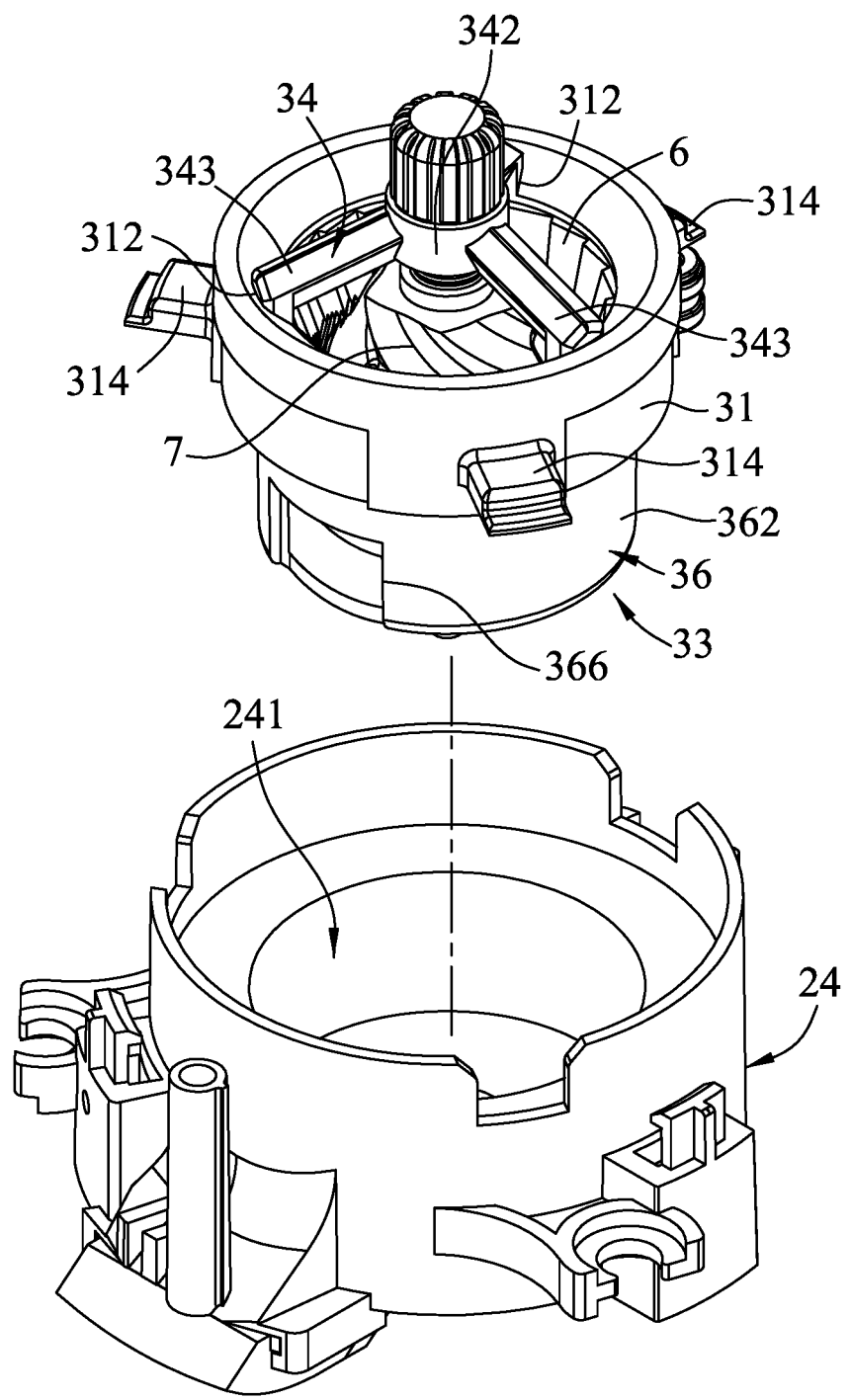
FIG. 6 is an exploded isometric view showing that the grinding mechanism of the first embodiment can be wholly detached from the grinding seat.

Referring to FIGS. 4-6, in the first embodiment, the outer grinding unit 6 is assembled to the first supporting seat 31 of the supporting unit 3, the rotating shaft unit 4 is inserted between the first supporting seat 31 and the second supporting seat 36, the inner grinding unit 7, the outer grinding unit 6 and the powder cleaning unit 8 are sleeved on the rotating shaft unit 4. Thus, the user only needs to take out the first supporting seat 31 and the second supporting seat 36 of the supporting unit 3, so that the grinding mechanism 22 of the first embodiment can be wholly detached from the grinding mechanism 24, as shown in FIG. 6, and the whole grinding mechanism 22 can be taken out for cleaning or washing, which is quite convenient.

When the grinding mechanism 22 is taken out relative to the driving mechanism 23 and the grinding seat 24, the first shaft part 41 and the second shaft part 42 are still limited and supported by the first bearing 35 and the second bearing 37 respectively, or in other words, the second shaft part 42 is still limited and supported by the second supporting assembly 33 when losing the limiting and supporting of the driving mechanism 23. Therefore, the stability of the rotating shaft unit 4 is quite good when the grinding mechanism 22 is taken out, and the rotating shaft unit 4 will not shake relative to the supporting unit 3. The foregoing design has the advantages of convenient assembly. As long as the limiting blocks 314 of the first supporting seat 31 are aligned with the limiting grooves 244 of the grinding seat 24, in other words, as long as the supporting unit 3 is installed relative to the grinding seat 24, the second shaft part 42 of the rotating shaft unit 4 will be aligned with and inserted into the through hole 243 of the grinding seat 24 and the assembling hole 231 of the driving mechanism 23, which is quite convenient for the users to install.

In the operation of the grinding device of the first embodiment, that is, when the rotating shaft unit 4 rotates, the films 821 of the powder cleaning unit 8 can push out the coffee powder from the powder outlet 366 of the second supporting seat 36. In addition, since the films 821 are abutted on the bottom base 361 of the second supporting seat 36, when the films 821 rotate, the powder generated by grinding can be prevented from adhering to the bottom base 361.

Figure 7:
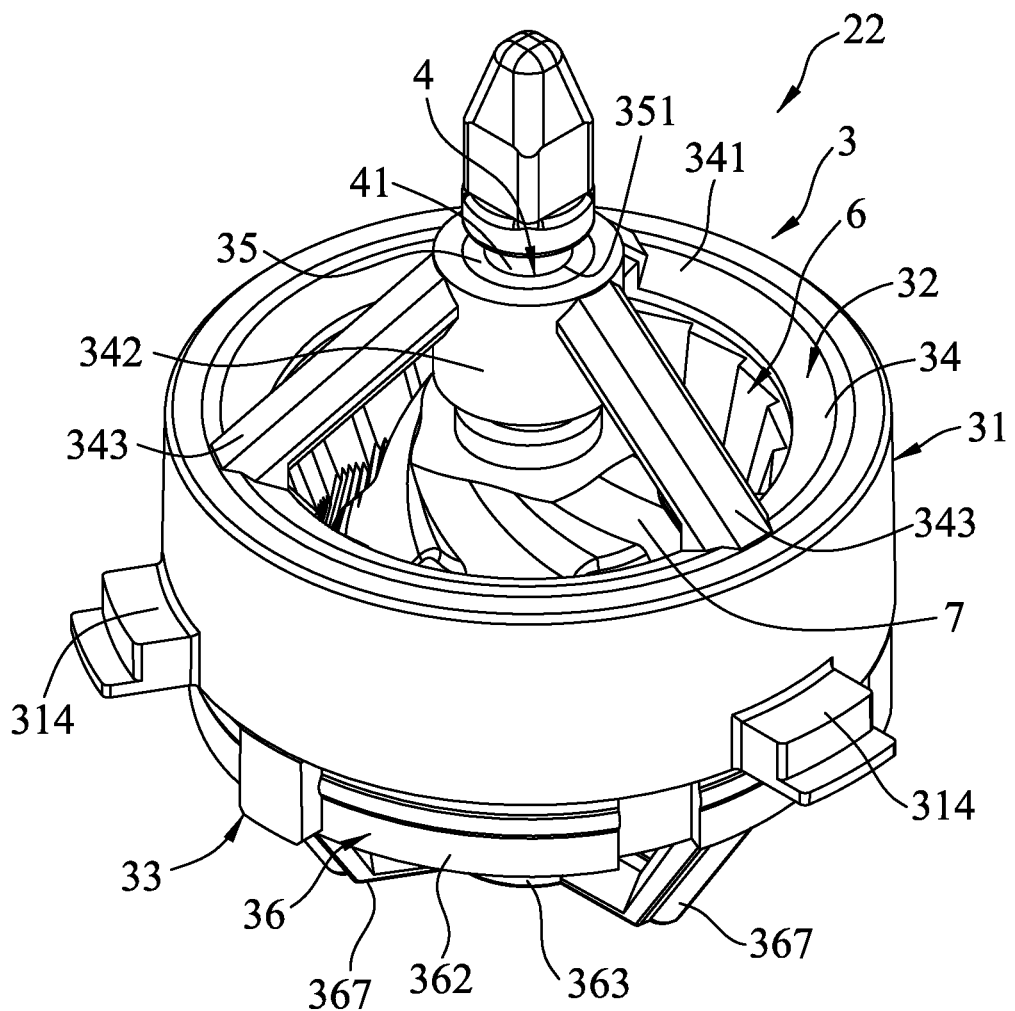
FIG. 7 is an isometric view showing a grinding device according to the second embodiment of the present invention.
Figure 8:
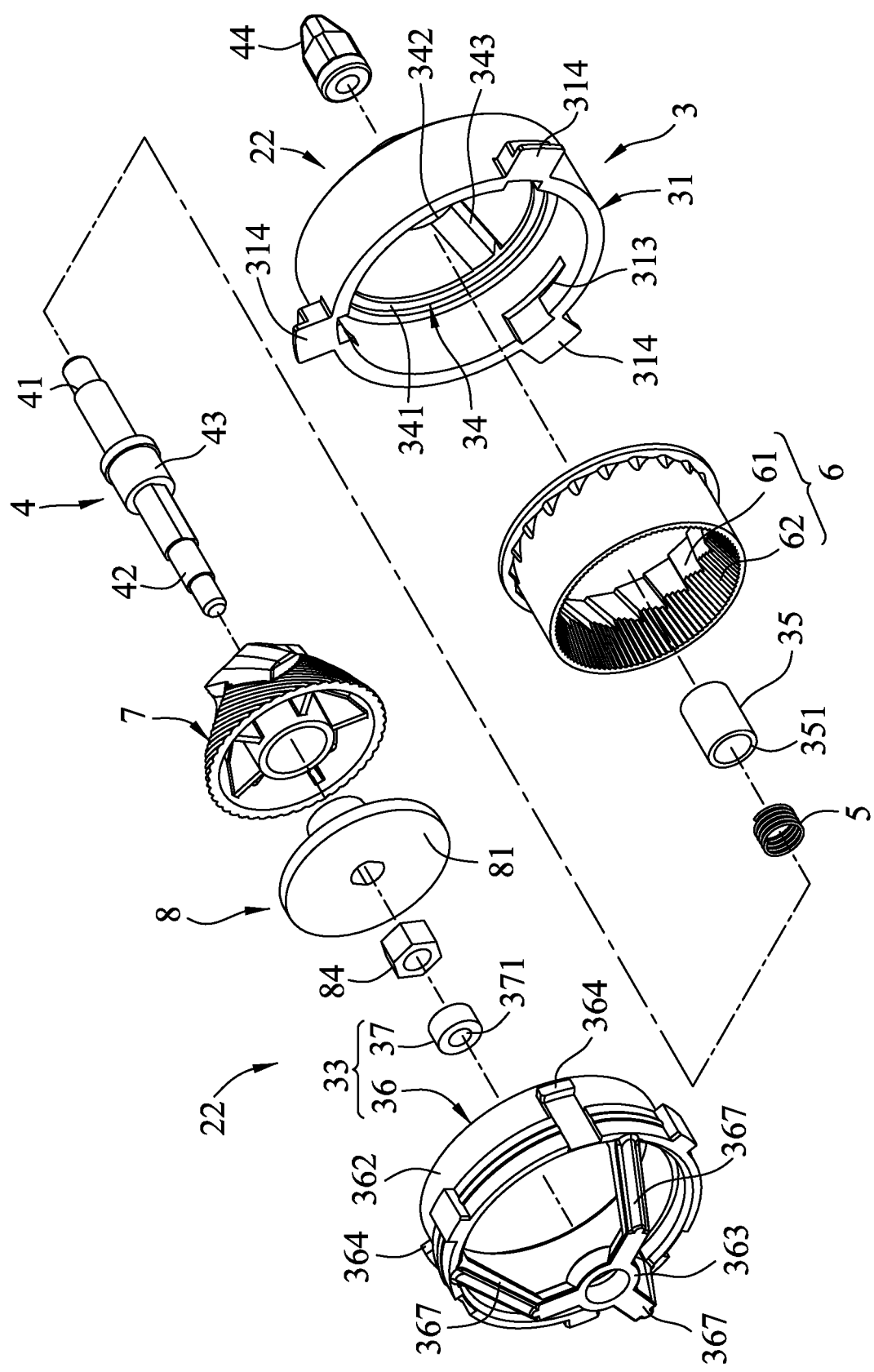
FIG. 8 is an exploded isometric view showing the grinding device of the second embodiment.
Figure 9:
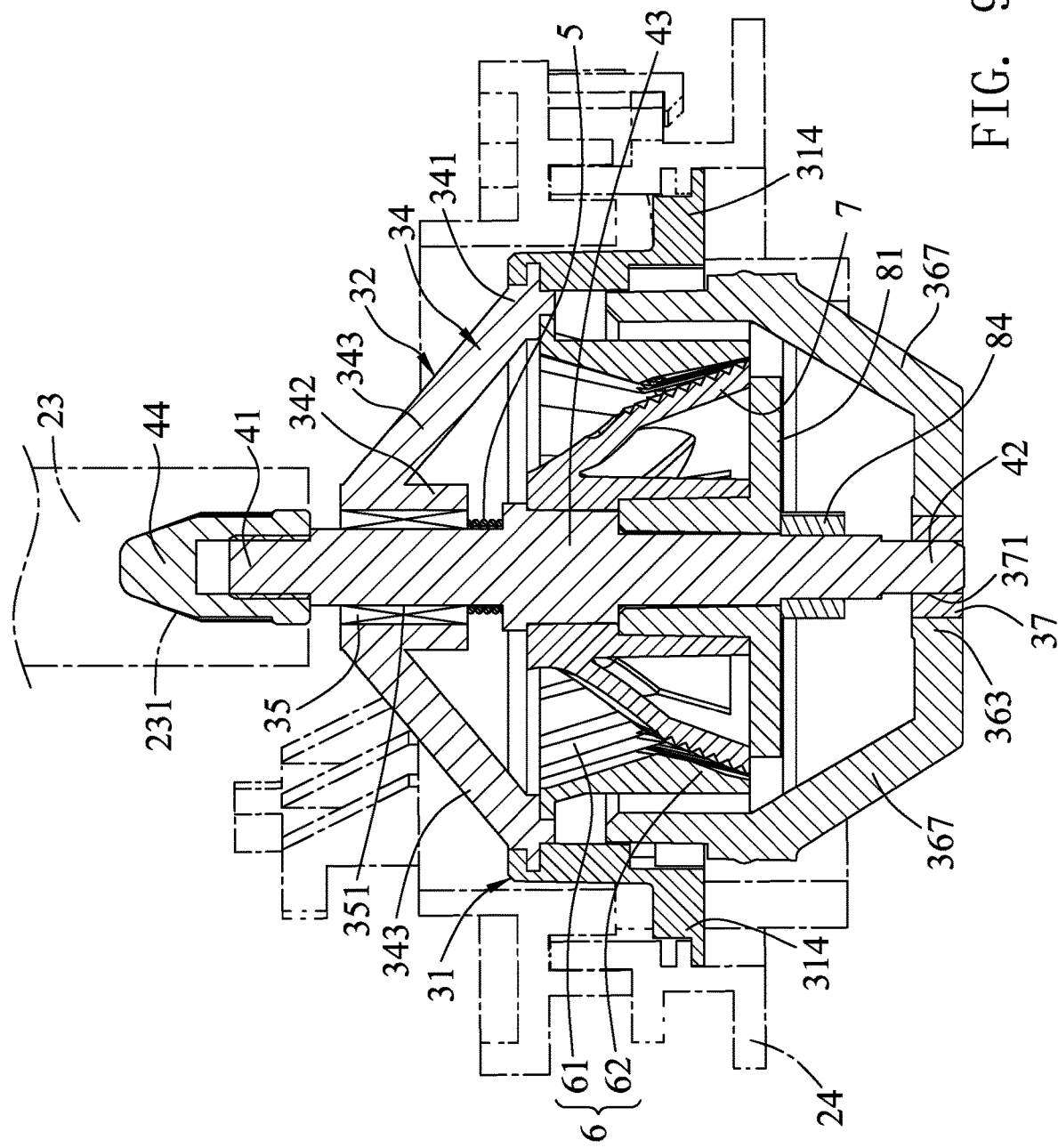
FIG. 9 is an assembled isometric view showing the grinding device of the second embodiment.

Referring to FIGS. 7-9, a second embodiment of the grinding device of the present invention is similar to the first embodiment, with the differences described as follows. The first supporting seat 31 and the first supporting member 34 of the first supporting assembly 32 are integrally formed. The second supporting seat 36 omits the bottom base 361 (see FIG. 4) and the powder outlet 366, and the second supporting seat 36 includes a plurality of rib walls 367 connected between the peripheral wall 362 and the annular seat 363. The driving mechanism 23 is located above the grinding mechanism 22, and further includes a clutch 44 sleeved on the top of the first shaft part 41 and having a polygonal cross section. The clutch 44 can be detachably inserted into the assembling hole 231 of the driving mechanism 23, so that the first shaft part 41 is detachably inserted into the driving mechanism 23. The bottom end of the second shaft part 42 of the rotating shaft unit 4 is embedded in the second bearing 37 of the second supporting assembly 33. The powder cleaning unit 8 omits the plastic member 82 and the second supporting member 83, and the shape of the third supporting member 84 is slightly different.

Since the supporting unit 3 of the second embodiment can also support and limit the two opposite ends of the rotating shaft unit 4, the same effect as the first embodiment can be achieved. In addition, the second embodiment is characterized in that the driving mechanism 23 drives the rotating shaft unit 4 from the top, and is not located at the bottom to block the coffee powder from falling down. Therefore, the coffee powder after being ground can fall out directly, and the second shaft part 42 of the rotating shaft unit 4 can be shortened because there is no need to connect to the driving mechanism 23.

In the second embodiment, the number of the ribs 343 of the first supporting member 34 and the rib walls 367 of the second supporting seat 36 are respectively three, but it is not limited in other embodiments of the present invention. In other words, the number of the ribs 343 of the first supporting member 34 and the rib walls 367 of the second supporting seat 36 can also be two, four, five or more.

In conclusion, the rotating shaft unit 4 is supported and limited by the supporting unit 3 in the grinding mechanism 22 of the grinding device of the present invention, to improve the stability of the rotating shaft unit 4 and solve the existing problem of poor stability. Thus, the object of the present invention can be achieved.

The above are only the specific embodiments of the present invention, and are not intended to limit the present invention. Any modifications, equivalents, improvements, etc., which are within the spirit of the present invention, should be included in the scope of the claims the present invention.

What is claimed is:

1. A grinding device comprising a grinding mechanism, a driving mechanism capable of driving the grinding mechanism to operate, and a grinding seat, the grinding mechanism being located inside the grinding seat, the grinding mechanism comprising a rotating shaft unit inserted in and protruded downwardly from the grinding seat to be rotatably connected to the driving mechanism, an inner grinding unit sleeved on and fixed to the rotating shaft unit, an outer grinding unit surrounding and spaced from the inner grinding unit, the grinding mechanism further comprising a supporting unit sleeved on and abutted against the rotating shaft unit, the supporting unit comprising a first bearing located above and spaced from the inner grinding unit along an axial direction of the rotating shaft unit and a second bearing located below and spaced from the inner grinding unit along the axial direction of the rotating shaft unit, the first bearing defining a first supporting hole therein, the second bearing defining a second supporting hole therein, a top end of the rotating shaft unit rotationally inserted in the first supporting hole, a bottom end of the rotating shaft unit rotationally inserted in the second supporting hole, wherein the driving mechanism is located below the grinding mechanism, the driving mechanism is provided with an assembling hole located under the second supporting hole, the bottom end of the rotating shaft unit is further detachably inserted into the assembling hole, and the supporting unit further comprises a first supporting seat detachably assembled and connected to the grinding seat, so that the grinding mechanism is able to be upwardly detached from or reassembled to the grinding seat;

wherein the driving mechanism drives the rotating shaft unit to rotate in the first supporting hole and the second supporting hole, with the top end and the bottom end of the rotating shaft unit being respectively abutted against and supported by the first bearing and the second bearing, and rotating shaft unit brings the inner grinding unit to rotate to cause the inner grinding unit to grind the substance to be ground in cooperation with the outer grinding unit.

2. The grinding device of claim 1, wherein the supporting unit further comprises a first supporting assembly connected to the first supporting seat and sleeved on the rotating shaft unit.

3. The grinding device of claim 2, wherein the supporting unit further comprises a second supporting assembly assembled to the first supporting seat and inserted by the rotating shaft unit, the second supporting assembly is sleeved on the rotating shaft unit.

4. The grinding device of claim 3, wherein the second supporting assembly comprises the second bearing defining the second supporting hole and a second supporting seat fixedly assembled to the first supporting seat and supporting the second bearing, the inner grinding unit and the outer grinding unit are received in the second supporting seat, the second supporting seat is received in the grinding seat, so that the second supporting seat is located between the outer grinding unit and the grinding seat.

5. The grinding device of claim 4, wherein the grinding mechanism further comprises a powder cleaning unit received in the second supporting seat and located under the inner grinding unit, the powder cleaning unit is sleeved on and fixed to the rotating shaft unit so that the rotating shaft unit brings the powder cleaning unit to rotate when the driving mechanism drives the rotating shaft unit to rotate.

6. The grinding device of claim 5, wherein the second supporting seat comprises a bottom base used for the second bearing to be inserted into, and a peripheral wall extending upwards from the bottom base, the bottom base is cooperated with the peripheral wall to define a receiving space for receiving the inner grinding unit, the outer grinding unit and the powder cleaning unit.

7. The grinding device of claim 6, wherein a plurality of assembling grooves which are spaced from each other and inverted L-shaped are formed at a bottom of the first supporting seat, the second supporting seat further comprises a plurality of assembling blocks extending radially outwards from the peripheral wall, the assembling blocks are fixedly embedded in the assembling grooves, respectively.

8. The grinding device of claim 6, wherein the second supporting seat further comprises an annular seat extending downwards from the bottom base, the second bearing is inserted and fixed in the annular seat.

9. The grinding device of claim 6, wherein the powder cleaning unit is located between the bottom base of the second supporting seat and the inner grinding unit along the axial direction of the rotating shaft unit, the powder cleaning unit comprises a rotary member sleeved on and fixed to the rotating shaft unit and a plastic member connected to the rotary member, the plastic member comprises a plurality of films extending outwards and abutting against the bottom base to clean and discharge the powder being ground when the powder cleaning unit rotates with the rotating shaft unit.

10. The grinding device of claim 2, wherein the first supporting assembly comprises the first bearing defining the first supporting hole and a first supporting member fixedly connected to the first supporting seat and supporting the first bearing.

11. The grinding device of claim 10, wherein the rotating shaft unit comprises a first shaft part inserted in the first supporting hole, an opposite second shaft part inserted in the second supporting hole and the assembling hole, and a connecting shaft part connected between the first shaft part and the second shaft part and having an outer diameter larger than the first shaft part, the supporting unit further comprises an elastic member sleeved on the first shaft part and sandwiched between the connecting shaft part and the first bearing of the first supporting assembly.

12. The grinding device of claim 10, wherein the first supporting member comprises an outer ring fixedly connected to the first supporting seat, an inner ring spaced from the outer ring and provided for the insertion and fixing of the first bearing, and a plurality of ribs connected between the outer ring and the inner ring.

13. The grinding device of claim 12, wherein an annular groove is formed at a top of the first supporting seat, a plurality of rib holding grooves extend upwards from the annular groove and are spaced from each other, the outer ring of the first supporting member is fixedly embedded in the annular groove, the ribs of the first supporting member are fixedly embedded in the rib holding grooves respectively.

14. The grinding device of claim 1, wherein the assembling hole has a polygonal cross section, the rotating shaft unit comprises a first shaft part at the top end of the rotating shaft unit and an opposite second shaft part at the bottom end of the rotating shaft unit, the second shaft part has a polygonal cross section and is detachably inserted into the assembling hole.

15. The grinding device of claim 1, wherein the first supporting seat comprises a plurality of limiting blocks which extend radially outwards, the grinding seat defines a grinding space provided for the grinding mechanism to install therein and a plurality of limiting grooves formed at a top of the grinding seat by recessing downwardly from top to bottom, the limiting blocks are detachably embedded in the limiting grooves, respectively.

16. The grinding device of claim 1, wherein the grinding device is mounted in a body of a coffee machine and used for grinding coffee beans.

* * * * *